United States Patent
Farkas et al.

(10) Patent No.: US 7,093,147 B2
(45) Date of Patent: Aug. 15, 2006

(54) DYNAMICALLY SELECTING PROCESSOR CORES FOR OVERALL POWER EFFICIENCY

(75) Inventors: Keith Farkas, San Carlos, CA (US); Norman P. Jouppi, Palo Alto, CA (US); Robert N. Mayo, Mountain View, CA (US); Parthasarathy Ranganathan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 461 days.

(21) Appl. No.: 10/423,397

(22) Filed: Apr. 25, 2003

(65) Prior Publication Data

US 2004/0215987 A1 Oct. 28, 2004

(51) Int. Cl.
*G06F 1/32* (2006.01)
(52) U.S. Cl. ...................................... 713/320
(58) Field of Classification Search ................. 713/320
See application file for complete search history.

(56) References Cited

U.S. PATENT DOCUMENTS 5,913,068 A * 6/1999 Matoba ....................... 713/322
6,804,632 B1 * 10/2004 Orenstien et al. ........... 702/188

OTHER PUBLICATIONS

R. Kumar et al., "Processor Power Reduction Via Single-ISA Heterogeneous Multi-core Architectures", In Computer Architecture Letters, vol. 2, Apr. 2003.*
R. Kumar et al., "A Multi-Core Approach to Addressing the Energy-Complexity Problem in Microprocessors", In Work on Complexity-Effective Design, Jun. 2003.*

* cited by examiner

Primary Examiner—Chun Cao
Assistant Examiner—Albert Wang

(57) ABSTRACT

A computer system for conserving operating power includes a number of computer hardware processor cores that differ amongst themselves in at least in their respective operating power requirements and processing capabilities. A monitor gathers performance metric information from each of the computer hardware processor cores that is specific to a particular run of application software then executing. A workload transfer mechanism transfers the executing application software to a second computer hardware processor core in a search for reduced operating power. A transfer delay mechanism is connected to delay a subsequent transfer of the executing application software if the system operating power may be conserved by such delay.

16 Claims, 2 Drawing Sheets

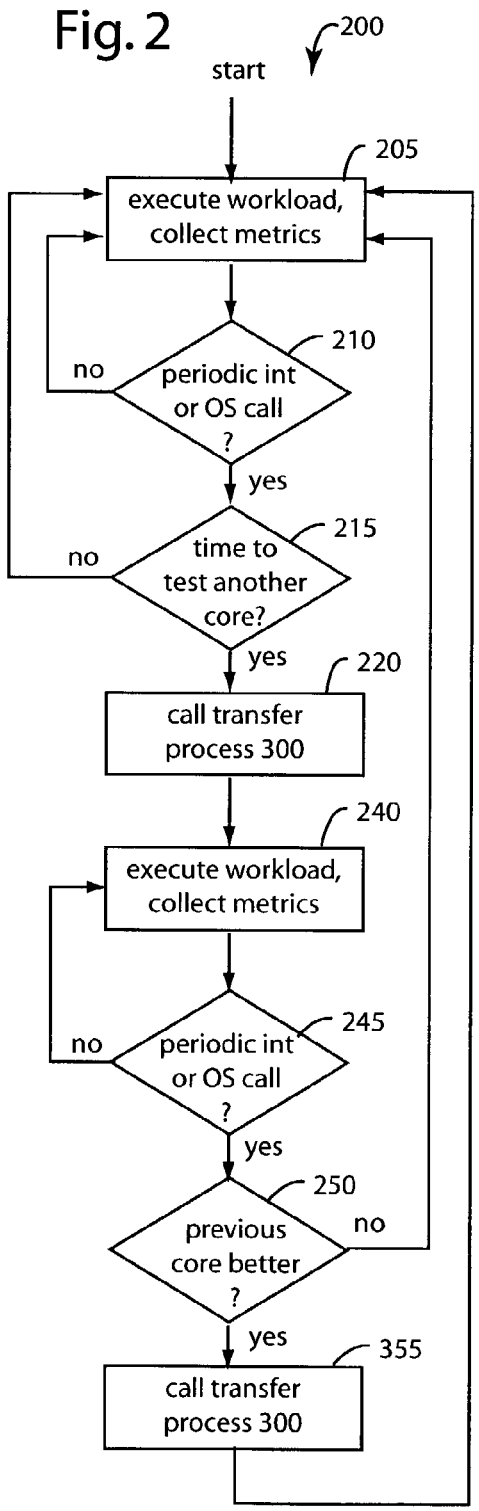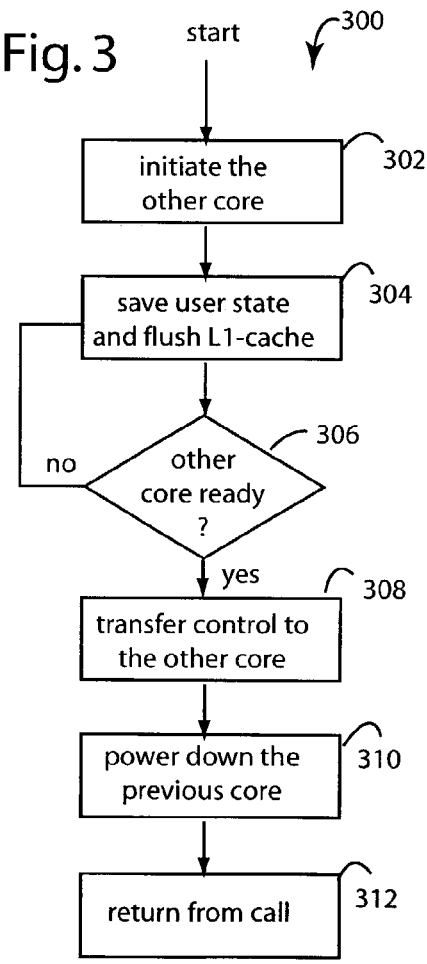

DYNAMICALLY SELECTING PROCESSOR CORES FOR OVERALL POWER EFFICIENCY

FIELD OF THE INVENTION

The present invention relates to computer systems, and more specifically to methods and devices for reducing power use by dispatching processing jobs to the more energy-efficient processor core, in a pool of different-capability processor cores, that nevertheless provides acceptable performance.

BACKGROUND OF THE INVENTION

Computer software application programs do not always require the high-capability computing hardware resources that are at their disposal. But if some critical code passage or whole application program must run at maximum efficiency, conventional systems dedicate the necessary computing hardware full time. In a few prior art multiprocessor systems that run applications that can be split and paralleled, pools of identical processor cores can be added in sufficient numbers to get the job done.

Some waste can be involved in the mismatching of software with modest resource requirements on high performance hardware platforms. When there is only one processor core available for all processing jobs, the waste of computing resources and power to operate them is unavoidable. High performance hardware is usually associated with large demands on operating power input. If such high performance is going to waste much of the time, the marginal operating power needed over more modest equipment is pure cost with no benefit.

Since their introduction in the 1970's, microprocessors and microcomputer systems have been providing ever more increasing levels of performance, reliability, and capability. Every few years since then has seen the microprocessor evolve to new, higher levels. Clock speeds got higher, memory subsystems, cache memories, and peripherals were brought in on-chip as semiconductor technology advances permitted. Complex instruction set computers (CISC) and reduced instruction set computers (RISC) evolved, and instruction and data bus widths reached 32-bits, 64-bits, and even 128-bits.

Device technologies have been changing. The first Intel microprocessors, e.g., the 4004, used p-channel metal oxide semiconductor (PMOS) technology. Later processors used n-channel metal oxide semiconductor (NMOS) technology. An RCA microprocessor family, the 1802, used low-power complementary metal oxide semiconductor (CMOS) technology. Some very high performance microprocessors in the 1970's and later used bipolar transistor technology. Today's MOS technology used in microprocessors has high leakage currents that require the operating power to actually be interrupted, or switched off, in order to reduce power consumption completely in inactive circuits.

In general, higher clock speeds and denser functionality has meant increased power consumption and hence dissipation. Such power dissipation causes undesirable heating and, in battery-operated portable systems, leads to reduced battery life. Constantly using a processor that uses a lot of power and that exceeds the needs of the application software can lead to significant power waste and costs.

SUMMARY OF THE INVENTION

An object of the present invention is to provide a method for reducing average power consumption in computing devices.

Another object of the present invention is to provide a computer system with reduced average power consumption.

Briefly, a computer system embodiment of the present invention comprises a number of processor cores consigned to a pool. Such processor cores differ in their respective levels and mix of power consumption, resources, performance, and other important measures. These processor cores can be arranged in a linear order according to estimates of one or more of these measures. An operating system associated with the processor core pool dispatches the execution of application programs to various processor cores and runs empirical tests. In general, the target processor core from the pool being sought for the job is the one that consumes a minimum of power and still yields acceptable performance. Such balance is determined statically for each workload based on data from prior executions of the workload. Alternatively, such balance is struck dynamically and empirically determined at run-time. Metrics are collected on how well an application runs on a particular processor core in the pool, for example during a one millisecond test period. If the current processor core is yielding better results than a previous processor core, then the job will not be transferred, and will be allowed to continue executing. If not, the job can be returned to the previous processor core in the ordered pool or a next processor core can be tried. The resource requirements between application programs can vary, as well as the requirements at different times within a single application.

An advantage of the present invention is that a system is provided that can conserve battery power in portable computers.

Another advantage of the present invention is that a method is provided for conserving operating power and reducing power supply demands.

These and other objects and advantages of the present invention will no doubt become obvious to those of ordinary skill in the art after having read the following detailed description of the preferred embodiment as illustrated in the drawing figures.

DESCRIPTION OF THE DRAWINGS

FIG. 2 is a flowchart diagram of a process embodiment of the present invention for transferring software jobs amongst dissimilar cores in a pool of multiple processor cores; and FIG. 3 is a flowchart diagram of a subroutine that is called by the process of FIG. 2 and that transfers program control between processor cores.

DETAILED DESCRIPTION OF THE EMBODIMENTS

Figure 1:
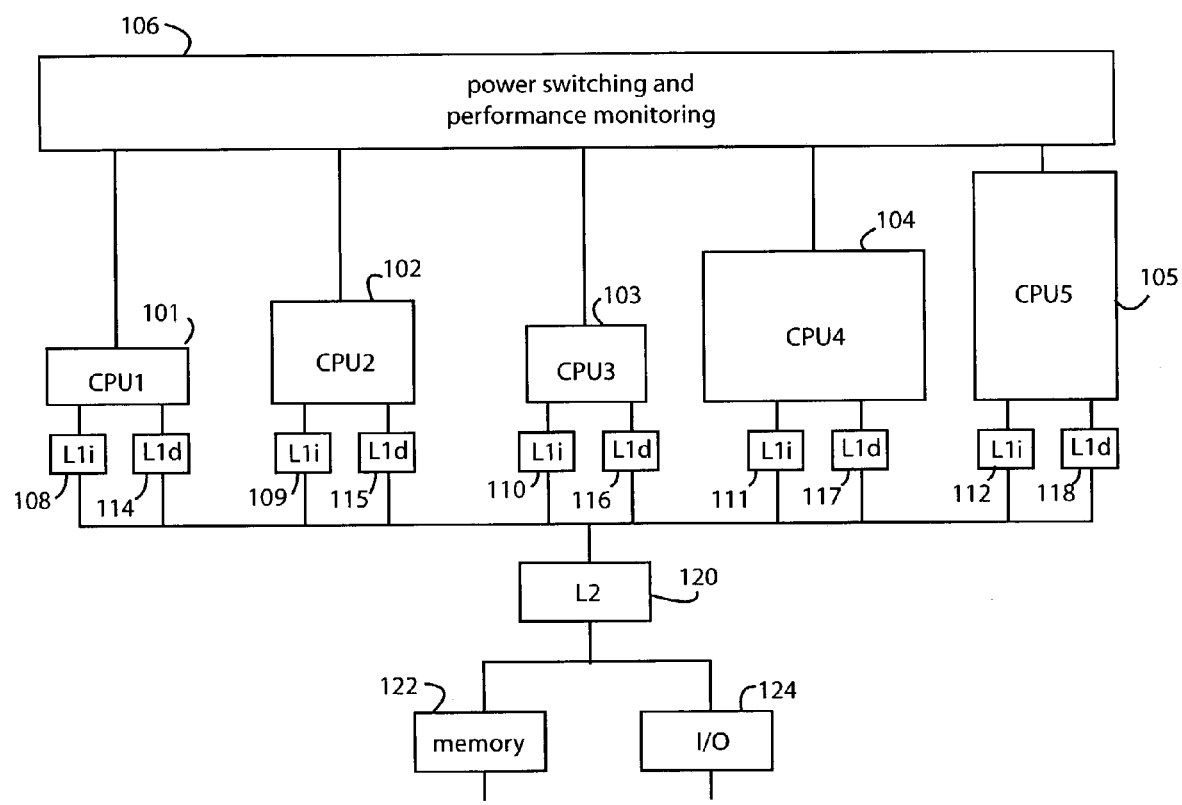
FIG. 1 is a functional block diagram of an embodiment of the present invention comprising multiple processor cores.

FIG. 1 illustrates a multi-core processor system embodiment of the present invention, and is referred to herein by the general reference numeral 100. Multi-core processor system 100 is a heterogeneous multi-core and core-switching implementation in a chip-level multi-core processor (CMP) with multiple, diverse processor cores that all execute the same instruction set. Each processor core includes significantly different resources and demonstrates significantly different performance and energy efficiency levels for the same application software. The operating system software tries to match the applications to the different cores during an application's execution to make the best use of the available hardware while maximizing energy efficiency at a given minimum performance level.

The system 100 hosts an operating system and application software that can execute single-threaded or multi-threaded. The operating system dispatches processing jobs to individual processor cores that differ in their power consumption, available resources, relative speeds, and other important measures. Such dissimilar processor cores are represented here in FIG. 1 as CPU1 101, CPU2 102, CPU3 103, CPU4 104, and CPU5 105. A minimum of two dissimilar processor cores can yield the benefits of the present invention if they differ in their respective power consumptions and one other critical measure, e.g., through-put. Therefore, showing the five CPU's 101–105 in FIG. 1 is merely for purposes of discussion here. Such processor cores can execute more than one process or thread at a time.

The multi-core processor system 100 comprises a pool of dissimilar processor cores 101–105 that receive their respective power supplies from a power switch and monitor 106. Such also provides monitoring information reported as metrics by each of the processor cores 101–105 during their respective execution of software programs. The metrics can include number of cache misses, etc.

Each processor core 101–105 has a corresponding first level instruction cache (L1i) 108–112, and a corresponding first level data cache (L1d) 114–118. These all share a common second level cache (L2) 120, a main memory 122, and input/output (I/O) device 124. Operating system and application software execute from main memory 120 and are cached up through the respective second and first level caches to processor cores 101–105.

A timer is used to periodically interrupt the operating system, e.g., every one hundred time intervals. This interrupt invokes a transfer to and a test of one of the different cores, ordered according to some metric, for its energy or energy-delay product when running the current application software. For example, the test can sample the execution of the application for 1–2 time intervals. If the test of such different core results in a better energy-delay product metric than the previous core yielded, then the application software continues to execute on the new core. Otherwise, the application software is migrated back to the previous core, where it continues its execution from the point it reached before being migrated back to the previous core.

In order to gauge the impact on the energy-delay product, data on energy consumption is needed for each of the processor cores 101–105. A mechanism is needed to determine whether to migrate the program executing workloads between the processor cores 101–105. The migration or transfer of the program executing workloads needs to be accomplished with a minimal impact on any other performance metrics of interest.

A mechanism identifies the energy consumed by the different cores as a function of the workloads running on them. The metrics of interest may either be the total energy consumed by the system, the energy-delay product of the system, the peak power of the system, etc. The decision to migrate the workloads can use the metrics determined by the energy data, as well as other additional user-defined or workload-defined metrics. Such migration can be static or dynamic. The migration of workloads within cores can involve loss of state in other levels of the system, e.g. cache hierarchy, or more complicated ways to ensure that any performance loss is minimized.

FIG. 2 represents a method embodiment of the present invention for selecting which core to run in multi-core system 100 in FIG. 1. Such method is referred to herein by the general reference numeral 200. The method 200 is preferably implemented as a part of an operating system for multi-core system 100.

Method 200 begins with a step 205 that collects statistics or metrics as a workload executes on a given processor core. The statistics relate to its execution, power consumption, performance, and other metrics. A step 210 continues this monitoring process until a periodic interrupt occurs. Interrupts can be generated by a timer, an operating system (OS) call, etc. In a step 215, such periodic interrupt is serviced, and check is made to see if it is time to evaluate how well the workload executes on another core. The other core will differ, e.g., in a greater number of hardware resources, or one that is more energy efficient.

If it is not time to try another core, then control returns to continue executing on the present core. If it is time to try another core, then control passes to a process 300 (FIG. 3).

In a step 240, as a workload executes on a given processor core, statistics are collected about its execution, power consumption, performance, and other metrics. A step 245 continues monitoring until a periodic interrupt occurs. A timer or an operating system (OS) call can be used to generate these interrupts. In a step 250, the interrupt is serviced, and an analysis is made to determine if the performance with the previous core had been better. If not, and the current core is determined to be better performing, the workload continues executing where it was, e.g., in steps 205 and 210 until a next interrupt occurs.

If, however, the previous core was better performing according to the metrics, a step 255 calls to transfer the workload back to the original processor core, using process 300. Once the transfer is completed, the workload returns to executing steps 205 and 210, e.g., until a next interrupt is detected in step 215.

Referring now to FIG. 3, a transfer-workload-to-another-core process 300 begins with a step 302 in which the other core is powered up. In a step 304, the state of the application is saved to memory, and the cache of the current processor core is flushed. In a step 306, a test is made repeatedly in a loop to determine if the other core is ready to begin executing instructions. When it is ready, a step 308 transfers software control to the other core. The other core executes a special transfer program, e.g., as a part of the operating system. In a step 310, such special transfer program powers down the original, previous, core. In a step 312, program control returns to the workload which begins executing at the point it reached when interrupted, e.g., step 215 (FIG. 2).

Single instruction-set architecture (ISA) heterogeneous multi-core embodiments of the present invention are used to reduce overall average power consumption in an appliance. System software includes routines to evaluate the resources required by a running application for good performance. The system software dynamically chooses the one processor core that can best meet the present requirements while minimizing energy consumption. Alternatively, the system software dynamically chooses a next processor core that better meets the present requirements while minimizing energy consumption.

An analysis has shown that switching between five cores of varying performance and complexity can save, on an average, 24% in energy while only sacrificing 2% in performance. Switching for energy-delay product results in reductions up to 96% in energy-delay, while sacrificing no more than 28% in performance.

A study was made for both static and dynamic oracle core choosers, as well as a realistic dynamic heuristic-based core-switching algorithm. For many applications, core diversity is more valuable than core uniformity because there is an increased ability to fit the demands of the application software.

Embodiments of the present invention are based on a multicore architecture in which all the processor cores execute the same instruction set, but they each have different capabilities and performance levels. At run time, system software evaluates the resource requirements of an application and chooses the core that can best meet these requirements while minimizing energy consumption.

It was realized that diverse applications express varying resource requirements during their execution. For example, applications which have a large amount of instruction-level parallelism (ILP), can be efficiently serviced by cores that can issue many instructions per cycle such as a wide-issue superscalar CPU. But this same core, could be wasted on an application with little ILP that would perform just as well on a simpler core. The difference in power consumption between the two cores can be significant, and is directly proportional to the time the simple application runs on the big processor core. Method embodiments of the present invention therefore transfer the simple processing jobs to the smaller, lower power processor cores and switch off the operating power to the big cores if no other appropriate jobs can be run on them.

Prior art processor core designs for power-optimization use either voltage and frequency scaling of the processor core to lower the power, or used "gating" to turn on and off portions of the core, for power management. Heterogeneous multi-core embodiments of the present invention can also use such techniques for increased power savings. Voltage and frequency scaling techniques uniformly reduces the entire core's power parameters. Such power benefits are fundamentally limited by the process technology in which the processor core is built. Also, gating does not save on the power needed to drive the wires routed across the idle areas of the processor core.

A pragmatic way to implement a heterogeneous multicore architecture includes the use of a family of processor cores developed over a long period of time. The processor cores' respective interfaces are modified to combine them into a single multi-core processor. An entire family of processor cores can typically be incorporated on a die only slightly larger than that required by the most advanced core. The clock frequencies of the earlier developed cores typically scale with the semiconductor technology, and so would be much closer to that of the latest processor technology. The primary criterion for selecting between different cores would be the performance of each architecture and the resulting energy consumption.

In one model example of a single-ISA heterogeneous architecture, five representative cores were chosen. Typical software applications place highly varied demands on an execution architecture, and that demand can vary significantly between execution phases in a single application program. Embodiments of the present invention depend on being able to dynamically switch program execution between cores, e.g., to settle on the best core and to adapt to phase changes. Typical reductions in processor core energy-delay product can be as high as 96%.

In heterogeneous multi-core architectures, the performance difference between cores varies depending on the workloads. The best core for one application, according to some measure, may not be best for another. One application may benefit greatly from wide issue and dynamic scheduling, while another will not benefit from either. So, the latter application gains nothing from the extra power required for it to run on a high-performance processor core.

The cores selected for a heterogeneous multi-core processor core design should have a wide range and evenly spaced levels of complexity versus performance. Using the Digital Equipment (now Hewlett-Packard) Alpha processor core series as an example of this, a single-threaded version of the Alpha 21464 (EV8-), and the MIPS R4700 were combined with the Alpha 21064 (EV4), Alpha 21164 (EV5), and the Alpha 21264 (EV6). The MIPS R4700 processor core was originally targeted for very low-power applications. Table-I compares some important parameters. The number of miss information/status handling registers (MSHR's) increases for each of the five types.

TABLE I

|  | R4700 | EV4 | EV5 | EV6 | EV8 |
|---|---|---|---|---|---|
| issue-width | 1 | 2 | 4 | 6 (OOO) | 8 (OOO) |
| i-cache | 16 KB, 2-way | 8 KB, DM | 8 KB, DM | 64 KB, 2-way | 64 KB, 4-way |
| d-cache | 16 KB, 2-way | 8 KB, DM | 8 KB, DM | 64 KB, 2-way | 64 KB, 4-way |
| branch prediction | Static | 2 KB, 1-bit | 2K-gshare | hybrid 2-level | hybrid 2-level (2× EV6 size) |
| number of MSHR's | 1 | 2 | 4 | 8 | 16 |

Core switching is greatly simplified if the cores can share a single executable, so a variant of the R4700 was assumed that executes the Alpha ISA. As in FIG. 1, the five cores have 64-bit architectures and private L1 data and instruction caches. They all share a common L2-cache, phase-lock loop circuitry, and input/output pins. Real power and area data was available for all these processor cores, except the EV8. So projected numbers for EV8 are presented here in Table-II.

TABLE II

|  | core-power (watts) | core-area (mm$^2$) | power/area watt/mm$^2$ |
|---|---|---|---|
| R4700 | 0.68 | 2.80 | 0.24 |
| EV4 | 5.01 | 2.87 | 1.75 |
| EV5 | 9.91 | 5.06 | 1.96 |
| EV6 | 17.09 | 24.5 | 0.697 |
| EV8- | 67.2 | 236.0 | 0.285 |

Table-II lists the relative sizes of the cores assuming they are all implemented in a 0.10 micron technology. The resulting multi-core processor is only modestly larger than the EV8-core alone. The second column in Table-II summarizes the power consumed by the cores at 0.10 micron technology. The EV8 core consumes almost a hundred times the power, and eighty times the real estate of the R4700 core.

The multithreaded features of EV8 are subtracted from the model because only one application running at a time on only one core is assumed here to simplify this discussion. It is further assumed here that more than one of any core type is not needed. So with only one core active at a time, cache coherence is implemented by flushing dirty data from the current core's L1 data cache before the software application execution is transferred to another core.

Each core has a different energy efficiency for the same workload. Typical programs go through phases with different execution characteristics, the best core during one phase may not be best for the next phase.

There is a cost associated with transferring program execution to another core, so the granularity of switching should be restricted to keep such costs insignificant. One method of restriction switches only at operating system time slice intervals, e.g., when execution is in the operating system, and the user states have already been saved to memory.

Referring now to FIG. 1, when the operating system decides a transfer of software execution to a next core is needed, it triggers an L1d cache flush to save all dirty cache data to the shared L2 120, the new core is powered up with power switch 106, and a signal is sent to the new core to start at a predefined operating system entry point. The new core powers down the old core, and returns, for example, from a timer interrupt handler. The user state saved by the old core is loaded from memory into the new core as a usual consequence of returning from the operating system. Alternatively, workloads can be transferred to different cores at the granularity of the entire application, or chosen statically.

While not shown in the drawings, a given processor core can be assumed to be powered up after a thousand cycles. With a 2.1 GHz clock, that represents a delay of about 500 nanoseconds. The phase-lock loop that generates the clock for the core is not powered down. One phase lock loop generates the clocks for all cores. The power-up time of a core principally depends on the time required for the power buses to charge and stabilize. A staged power up is preferred to avoid injecting excessive noise on the power bus bars of the multicore processor.

In one analysis, an implementation of the multicore processor system 100 was assumed to use 0.10 micron semiconductor technology. The cores have private first level (L1) caches, and share an on-chip 3.5 MB 7-way set associative L2-cache. At 0.10 micron, such cache will occupy an area just under half the die-size of an Intel Pentium-4. All the Alpha cores (EV4, EV5, EV6, EV8-) were assumed to run at 2.1 GHz. An EV6 core will operate at 2.1 GHz if its 600 MHz, 0.35 micron implementation was scaled to a 0.10 micron technology. Since the Alpha cores were originally designed to run at high frequency, they should all readily scale to 2.1 GHz. In contrast, the R4700 was not designed for high clock rates, so a 1.0 GHz clock is assumed here for the analysis.

The EV8-cache associativity is double that of equally-sized EV6 caches, e.g., to account for increased speculation due to higher issue-width. The EV8 uses a tournament predictor double the size of the EV6 branch predictor. All the caches were assumed to be non-blocking, but the number of miss information/status handling registers (MSHR's) is assumed to double with successive cores to help the adjustment to increasing issue width. All the out-of-order cores were assumed to have big enough re-order buffers and large enough load/store queues to ensure no conflicts for these structures.

The various miss penalties and L2-cache access latencies for the simulated cores were determined using an integrated model of cache access time, cycle time, area, aspect ratio, and power. The penalties were calculated by adding one cycle to the access times for each L1-miss detection, going to L2, and coming from L2. The L2 access time was calculated by assuming that the L2 data and tag accesses are serialized. So the data memories do not have to be cycled on a miss, and only the required set is cycled on a hit. Memory latency was determined to be 150 ns. Switching intervals should be long enough so that the impact of both effects on performance is less than 1%.

A simple, sample-based switching heuristic was used that tests one of the two neighboring cores, at random, every one hundred time intervals for 1–2 intervals. A software transfer to it is initiated if the energy-delay product of the new core seems better. For example, the threshold should be such that the last interval is an improvement in energy-delay product over the previous core. The first interval is ignored because of cold-start effects.

Such heuristic slightly outperformed a variant that sampled a core at random, rather than only sampling neighbors. The first heuristic is a local-minimum finding approach, which will fail if there is a significant performance-complexity gap in our set of cores. In that case, the variant would solve the problem. However, when the cores are chosen well the first heuristic finds the best core more quickly.

In tests, one heuristic like this resulted in energy-delay savings of up to 65% and averages 54%, verifying that much of the benefit of this architecture can be realized with a realistic algorithm, accounting for performance and energy overheads.

Oracle results for both dynamic and static switching based on the energy-delay metric showed when core selection is not hampered with performance constraints, there is no performance threshold that needs to be satisfied while making a decision about the best core. The sampling-based dynamic heuristic achieved over 72% of the gains available for an oracle-based dynamic switcher with no switching overhead. The performance degradation on applying the dynamic heuristic was less than two oracle-based schemes tried because the heuristic was more conservative than the oracle in terms of next-core selection.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

The invention claimed is:

1. A multi-core processor computer system for conserving average operating power, comprising:
 a plurality of computer hardware processor cores that differ amongst themselves in at least their respective operating power requirements and processing capabilities;
 a monitor for gathering performance and power metric information from a first one of said computer hardware processor cores that is running software; and
 a workload transfer and control mechanism connected to the plurality of computer hardware processor cores and to the monitor to select a second one of said processing cores to run the software,
 wherein the monitor gathers performance and power metric information from the second one of the processing cores, and
 wherein the workload transfer and control mechanism compares the performance and power metric information from the second processing core with the performance and power metric information from the first processing core, and selects one of the first and second processing cores to continue running the software based on the comparison.

2. The computer system of claim 1, wherein:
the monitor for gathering performance and power information can be based on metrics derived from other similar workloads on other similar cores.

3. The computer system of claim 1, wherein:
the plurality of computer hardware processor cores comprise dissimilar processor cores all disposed on a single semiconductor die.

4. The computer system of claim 1, wherein:
the workload transfer and control mechanism includes a power switch providing for the independent interruption of operating power to selected individual ones of the plurality of computer hardware processor cores not then required to execute any software.

5. The computer system of claim 1, wherein:
the workload transfer and control mechanism provides for input from the software or the user on the feasibility and benefits of moving workloads between the cores.

6. The computer system of claim 1, wherein:
the workload transfer and control mechanism can be disabled at user, operating system, or application discretion.

7. The computer system of claim 1, wherein:
workloads are statically associated for execution on specific processor cores.

8. The computer system of claim 1, further comprising:
an operating system connected to the plurality of computer hardware processor cores, the monitor, and the workload transfer and control mechanism, and that provides for assessments of information received from the monitor, and that further provides for management of any transfers of the software between individuals of the plurality of computer hardware processor cores.

9. A multi-core processor computer system for conserving average operating power, comprising:
a plurality of computer hardware processor cores that differ amongst themselves in at least their respective operating power requirements and processing capabilities;
a monitor for gathering performance and power metric information from each of said computer hardware processor cores that is specific to a particular run of application software then executing on a first computer hardware processor core in the plurality of computer hardware processor cores;
a workload transfer and control mechanism connected to the plurality of computer hardware processor cores and to the monitor, and providing for a transfer of said application software then executing to a second computer hardware processor core in the plurality of computer hardware processor cores; and
a transfer delay mechanism connected to delay a subsequent transfer of said application software then executing if an overall operating power of the system may be conserved by said delay.

10. The computer system of claim 9, wherein:
the workload transfer and control mechanism provides for a skipping over of individual ones of the plurality of computer hardware processor cores to transfer to that are already executing another thread of application software.

11. A method for operating a multi-core processor computer system, the method comprising the steps of:
executing a software application program on one of at least two processor cores in the computer system;
collecting a performance metric and power consumption metric from said one of said processor cores;
comparing said performance metric and power consumption metric to another performance metric and power consumption metric obtained from another of said processor cores; and
transferring said software application program to execute on said another of said processor cores in response to comparing the performance metrics and power consumption metrics,
wherein executing the software application program on one of the at least two processor cores comprises executing the software application program on one of the at least two processor cores provided on a single semiconductor chip having differing operating power requirements.

12. The method of claim 11, wherein:
executing the software application program on one of the processor cores comprises executing the software application program on one of the processor cores that differ in their respective processor core resources.

13. The method of claim 11, wherein:
executing the software application program on one of the processor cores comprises executing the software application program on one of the processor cores that are capable of executing the same instruction sets.

14. A method for operating a multi-core processor computer system, the method comprising the steps of:
executing a software application program on one of at least two processor cores in the computer system that have differing operating power requirements, the at least two processor cores being on a single semiconductor chip;
collecting a performance metric from said one of said processor cores;
comparing said performance metric to another performance metric obtained from another of said processor cores;
transferring said software application program to execute on said another of said processor cores depending on the power consumption; and
timing the duration of the step of executing such that the step of collecting said performance metric is substantially shorter compared to a time allowed to lapse between successive steps of collecting.

15. A method for operating a multi-core processor computer system having at least two processor cores on a single semiconductor chip that have differing operating power models and performance levels, the method comprising the steps of:
executing a software application program on a first one of said processor cores for a first time interval;

collecting a first performance metric from said first one of said processor cores;

transferring said software application program to execute on a second one of said processor cores for a second time interval that is shorter than said first time interval;

collecting a second performance metric from said second one of said processor cores;

comparing said first and second performance metrics to determine a favored one of said processor cores according to one or more predetermined criteria; and transferring said software application program to execute on said second one of said processor cores depending on a result obtained in the step of comparing.

16. The method of claim 15, further comprising the step of:

looping back from the step of transferring to the step of executing to constantly search for one of said processor cores that will be then favored in the step of comparing.

* * * * *